(12) United States Patent
Boroditsky et al.

(10) Patent No.: US 7,852,467 B2
(45) Date of Patent: Dec. 14, 2010

(54) METHOD FOR INCREASING ACCURACY OF MEASUREMENT OF MEAN POLARIZATION MODE DISPERSION

(75) Inventors: Mikhail Boroditsky, South Amboy, NJ (US); Mikhail Brodsky, Milbourn, NJ (US); Nicholas J. Frigo, Little Silver, NJ (US); Peter Magill, Freehold, NJ (US)

(73) Assignee: At&T Intellectual Property II, L.P., Reno, NV (US)

( * ) Notice: Subject to any disclaimer, the term of this patent is extended or adjusted under 35 U.S.C. 154(b) by 0 days.

(21) Appl. No.: 12/702,968

(22) Filed: Feb. 9, 2010

(65) Prior Publication Data

US 2010/0134788 A1 Jun. 3, 2010

Related U.S. Application Data

(62) Division of application No. 10/747,804, filed on Dec. 29, 2003, now Pat. No. 7,292,322, and a division of application No. 11/860,593, filed on Sep. 25, 2007, now abandoned.

(51) Int. Cl.
*G01N 21/00* (2006.01)
(52) U.S. Cl. ..................................................... 356/73.1
(58) Field of Classification Search ........................ None
See application file for complete search history.

(56) References Cited

U.S. PATENT DOCUMENTS

| | | | |
|---|---|---|---|
| 5,717,489 A | 2/1998 | Ozeki et al. | |
| 5,930,414 A | 7/1999 | Fishman et al. | |
| 5,995,228 A | 11/1999 | Otani et al. | |
| 6,020,584 A | 2/2000 | Brarens et al. | |
| 6,380,533 B1 | 4/2002 | Jopson et al. | |
| 6,381,385 B1 | 4/2002 | Watley et al. | |
| 6,459,830 B1 | 10/2002 | Pua et al. | |
| 6,542,650 B2 | 4/2003 | Khosravani et al. | |
| 6,556,732 B1 | 4/2003 | Chowdhury et al. | |
| 6,647,176 B1 | 11/2003 | Pua et al. | |
| 6,734,955 B2 | 5/2004 | Wight et al. | |
| 6,867,918 B2 | 3/2005 | Damask | |
| 7,035,538 B2* | 4/2006 | Willner et al. | ................. 398/29 |
| 2003/0118263 A1* | 6/2003 | Phua et al. | ..................... 385/11 |

OTHER PUBLICATIONS

N. Gisin, et al., "How Accurately Can One Measure a Statistical Quantity Like Polarization-Mode Dispersion?", IEEE Photonics Technology Letters, Vol. 8, No. 12, Dec. 1996, pp. 1671-1673.

(Continued)

*Primary Examiner*—Tu T Nguyen
(74) *Attorney, Agent, or Firm*—Hoffmann & Baron, LLP

(57) ABSTRACT

The present invention provides a method of determining a mean differential group delay associated with a length of optical fiber. The method including measuring a magnitude of a polarization mode dispersion vector as a function of frequency, using a frequency-domain polarization mode dispersion measurement apparatus, where the magnitude of the polarization mode dispersion vector is a scalar differential group delay. Also the method calculates a frequency derivative of the scalar differential group delay from the magnitude of the polarization mode dispersion vector to obtain a first result. The frequency derivative of the scalar differential group delay being a scalar second-order polarization mode dispersion function. The method further multiplies a proportionality coefficient $B_2$ by the first result to calculate the mean differential group delay. Also, the method outputs a value of the mean differential group delay.

5 Claims, 5 Drawing Sheets

OTHER PUBLICATIONS

M. Shtaif, et al., "Study of the Frequency Autocorrelation of the Differential Group Delay in Fibers with Polarization Mode Dispersion", Optics Letters, vol. 25, No. 10, May 15, 2000, pp. 707-709.

Normand Cyr, Andre Girard, and Gregory W. Schinn, "Stokes Parameter Analysis Method, the Consolidated Test Method for PMD Measurements", NFOEC '99 Convention, Chicago, Ill. (1999).

R. M. Jopson, L. E. Nelson, H. Kogelnik, "Measurement of Second-Order Polarization-Mode Dispersion Vectors in Optical Fibers", IEEE Phot. Tech. Lett, vol. 11, pp. 1153-1155 (Sep. 1999).

Foschini, et al., "Probability Densities of Second-Order Polarization Mode Dispersion Including Polarization Dependent Chromatic Fiber Dispersion," IEEE Phot. Tech. Lett., vol. 12, pp. 293-295 (Mar. 2000).

N. Gisin, J.P. Von der Weid and J.P. Pellaux, "Polarization Mode Dispersion of Short and Long Single-Mode Fibers," J. Lightw. Technol., vol. 9, p. 821 (1991).

Karlsson, Magnus., "Probability Density Functions of the Differential Group Delay in Optical Fiber Communication Systems," Journal of Lightwave Technology, vol. 19, No. 3, pp. 324-331 (Mar. 2001).

Mecozzi, A., et al., "The Statistics of Polarization-Dependent Loss in Optical Communication Systems," IEEE Photonics Technology Letters, vol. 14, No. 3, pp. 313-315 (Mar. 2002).

Williams, Paul A., "Mode-coupled artifact standard for polarization-mode dispersion: design, assembly, and implementation," Applied Optics, vol. 38, No. 31, pp. 6498-6507 (Nov. 1, 1999).

Gisin, N., et al., "Definitions and Measurements of Polarization Mode Dispersion: Interferometric Versus Fixed Analyzer Methods," IEEE Photonics Technology Letters, vol. 6, No. 6, pp. 730-732 (Jun. 1994).

Foschini, G.J., et al., "Statistical Theory of Polarization Dispersion in Single Mode Fibers," Journal of Lightwave Technology, vol. 9, No. 11, pp. 1439-1456 (Nov. 1991).

Allen, Christopher T., et al., "Measured Temporal and Spectral PMD Characteristics and Their Implications for Network-Level Mitigation Approaches," Journal of Lightwave Technology, vol. 21, No. 1, pp. 79-86 (Jan. 2003).

Fogal, Sarah L., et al., "Multiple Importance Sampling for First- and Second-Order Polarization-Mode Dispersion," IEEE Photonics Technology Letters, vol. 14, No. 9, pp. 1273-1275 (Sep. 2002).

Sunnerud, Henrik, et al., "Polarization-Mode Dispersion in High-Speed Fiber-Optic Transmission Systems," Journal of Lightwave Technology, vol. 20, No. 12, pp. 2204-2219 (Dec. 2002).

Boroditsky, Misha, et al., "In-Service Measurements of Polarization-Mode Dispersion and Correlation to Bit-Error Rate," IEEE Photonics Technology Letters, vol. 15, No. 4, pp. 572-574 (Apr. 2003).

* cited by examiner

METHOD FOR INCREASING ACCURACY OF MEASUREMENT OF MEAN POLARIZATION MODE DISPERSION

CROSS-REFERENCE TO RELATED APPLICATION

This application is a divisional of U.S. application Ser. No. 10/747,804 filed Dec. 29, 2003 and issued as U.S. Pat. No. 7,292,322 on Nov. 6, 2007, which is incorporated herein by reference. Also, this application is being filed during the co-pendency of related divisional U.S. application Ser. No. 11/860,593 filed Sep. 25, 2007, which also claims priority to U.S. application Ser. No. 10/747,804.

FIELD OF THE INVENTION

The invention relates to the field of high-speed optical telecommunication systems, and more particularly to a method for increasing the accuracy of the measurement of mean polarization mode dispersion in optical fiber.

BACKGROUND OF THE INVENTION

The optical waveguides or fibers used to transmit signals in optical telecommunication systems are characterized, in part, by the vector property of polarization mode dispersion (PMD). Polarization mode dispersion occurs as a result of birefringence in the fiber, which may be caused by physical asymmetry in the fiber construction itself, or by stress, strain, or other external forces imposed on the fiber. In addition, random polarization coupling can occur, giving rise to a time-varying statistical factor. Optical fibers display an anisotropy in the refractive index, which will vary as a function of position and time. Consequently, components of an optical signal that differ in polarization will propagate at different velocities, resulting in a differential group delay (DGD) between the components, and causing significant broadening of the optical pulses propagating along long lengths of fiber.

The PMD is fully characterized by a vector quantity $\vec{\tau}(\omega)$ where the DGD is the magnitude of the vector $|\vec{\tau}(\omega)|$. As shown in FIG. 1, the DGD is generally designated as $\tau$ 10. Any state of polarization (SOP) can be resolved into directional components along two orthogonal principal states of polarization (PSP) 12, 14. The DGD or $\tau$ 10 then represents the separation in time between fast PSP 12 and slow PSP 14, after traversing a length of optical fiber 16. For each optical frequency or wavelength propagating in a fiber, there always exists two PSPs, such that the pulse spreading due to the first-order PMD vanishes if only one PSP is excited. The PMD is typically characterized in terms of an average DGD corresponding to different frequencies, and is independent, to first order, of wavelength, temperature, and external perturbations. In low mode coupled fiber, this measure of DGD averaged over a large range of optical frequencies is fairly constant over time, but in high mode coupled fibers, for example, in long fiber spans, the frequency-averaged DGD varies randomly in time, due to the combined effects of the variations in birefringence and random polarization mode coupling along the fiber length. This statistical variation in DGD lends itself to characterization of the DGD in terms of a statistical figure of merit, mean DGD.

Higher orders of the polarization mode dispersion also exhibit statistical properties. The effect of second-order polarization mode dispersion (SOPMD) 18 is shown in FIG. 1. The SOPMD is the first derivative of the PMD with respect to frequency, representing the change in the PMD as a function of frequency. The SOPMD, therefore, additionally characterizes the overall pulse spreading due to the frequency-dependence of the PMD and the spectral bandwidth of the injected optical pulse 19.

The polarization mode dispersion of a fiber is unlike most other sources of degradation in an optical telecommunication system, in its dependence on both time and frequency. Conventional methods for characterizing the full PMD vector over a frequency range, well known by those skilled in the art, include the Poincaré Sphere Analysis (PSA), the Jones Matrix Eigenvalue (JME), Müller Matrix Method (MMM), Fixed Analyzer and interferometric techniques. These methods provide a measure of mean DGD and root mean square (RMS) DGD, which is calculated from the set of frequency-dependent DGD values. It is then commonly assumed by those skilled in the art that the statistical DGD follows a Maxwellian distribution, so that a true mean DGD $\langle\tau\rangle$ determined by averaging the DGD values obtained for a number of fibers over a bandwidth B of optical frequencies, can be estimated by multiplying the measured RMS DGD $\sqrt{\langle\tau^2\rangle_a}$ by a factor of $$\sqrt{\frac{8}{3\pi}}.$$

The fundamental problem in accurately evaluating a statistical limitation to an estimation of the mean DGD of a fiber, in order to find a more precise measurement of the mean DGD, was first recognized in a paper by N. Gisin, B. Gisin, J. P. Von der Weid, and R. Passy, entitled "How Accurately Can One Measure a Statistical Quantity Like Polarization-Mode Dispersion?" *IEEE Photon. Tech. Lett.*, Vol. 12, pp. 1671-1673 (August 1996), which is incorporated herein by reference. The accuracy of mean DGD estimation does improve as the mean is taken over a larger spectral bandwidth (approaching the ideal theoretical case where B→∞). However, contrary to the statistical requirement that each of the measurements used to calculate an average be independent, the DGD at nearby wavelengths are not frequency independent. Gisin et al. demonstrated that this frequency dependence resulted in lower uncertainty in the mean DGD (around 9%) for larger PMD on the order of 1 picosecond (ps) e.g., as compared to a 28% uncertainty in mean DGD measurement when the PMD is smaller (on the order of 0.1 ps). The uncertainty in mean DGD measurement increases with decreasing source bandwidth. Gisin et al. demonstrated that the same level of uncertainty is intrinsic to all measurement techniques that average the DGD over wavelength.

The mathematical formalism was developed further by M. Shtaif and A. Mecozzi, "Study of the Frequency Autocorrelation of the Differential Group Delay in Fibers with Polarization Mode Dispersion," *IEEE Photon. Tech. Lett.*, Vol. 25, pp. 707-709 (May 2000), which is incorporated herein by reference. In measurements of the frequency autocorrelation of the DGD, the square DGD, and orientation of the PMD vector, Shtaif et al. showed that all corresponding correlation bandwidths are comparable. Shtaif et al. also showed that all statistical properties of the PMD characterizing the fiber under test are uniquely defined by the mean DGD.

Polarization mode dispersion (PMD) is recognized as a potentially limiting impairment for high-speed long-haul optical transmission. Moreover, precise measurement of the true mean differential group delay (DGD) of individual fiber links and whole fiber routes is important for accurate estimation of service outage probabilities. Since PMD varies with time, as well as with frequency, measurements of the mean frequency-averaged DGD of the same fiber taken at different times may differ from each other and from the true value of mean DGD for a given fiber. For DGD values in the usual range of interest, and within the optical bandwidths of commercially available equipment, the variance of DGD measurements is approximately inversely proportional to the optical bandwidth of the optical source used for the measurement. In other words, an accurate measurement of the mean DGD of low birefringence fiber is limited by the optical bandwidth of the source used for the measurement.

The need for precise PMD characterization will increase as the high-speed networks of the future employ very low PMD fibers. There exists a need, therefore, for more precise measurement of the mean DGD of individual fiber links and whole fiber routes than is presently provided by conventional methods.

SUMMARY OF THE INVENTION

The present invention, which addresses the needs unmet by conventional methods, relates to methods of improving accuracy of measuring a differential group delay (DGD) in an optical fiber link and in a whole optical fiber route.

A method of the present invention for measuring a true mean differential group delay $\langle\tau\rangle$ of at least a length of optical fiber includes the initial step of measuring a mean square differential group delay $\langle\tau^2\rangle_B$ averaged over a finite spectral bandwidth B of a source, using a polarization mode dispersion measurement apparatus. A root mean square differential group delay is then calculated in accordance with $\sqrt{\langle\tau^2\rangle_B}$ and a systematic correction factor $\epsilon$ to the conventional method of estimating true mean $\langle\tau\rangle$ from the measured root mean square differential group delay $\sqrt{\langle\tau^2\rangle_B}$ is applied. The systematic correction factor $\epsilon$ minimizes a systematic error caused by the finite spectral bandwidth of the source.

Preferably, the systematic correction factor E is applied to the mean square differential group delay in accordance with $$\langle\tau\rangle = \sqrt{\frac{8}{3\pi}\langle\tau^2\rangle_B} + c,$$

to obtain the true mean differential group delay $\langle\tau\rangle$ In the regime where $\tau_{RMS}B \gg 1$, $\langle\tau\rangle$ is calculated according to:

$$\langle\tau\rangle = \sqrt{\frac{8}{3\pi}\langle\tau^2\rangle_B} + \frac{8}{9\sqrt{2}}\frac{1}{B},$$ (16a) and (16b)

in other words, $$\epsilon \text{ is } \frac{8}{9\sqrt{2}}\frac{1}{B}.$$

This method, which is applied directly to a measured mean square differential group delay, may be applied to measurements taken using time-domain techniques with an apparatus such as an interferometer. This method may also be applied to measurements taken using frequency-domain techniques, such as Jones Matrix Eigenanalysis, Poincaré Sphere Analysis, and Müller Matrix Method using an apparatus, for example, including a polarimeter. The method may be used for measuring the mean differential group delay through a single optical fiber link, or an entire optical fiber route.

In another embodiment of the method of the present invention, a method for measuring a mean differential group delay $\langle\tau\rangle$ of at least one length of optical fiber, includes an initial step of characterizing a polarization mode dispersion vector as a function of frequency using a frequency-domain polarization mode dispersion measurement apparatus. The method further includes calculating a second-order polarization mode dispersion vector as a function of frequency $\vec{\tau}_\omega$ from the polarization mode dispersion vector, and calculating a mean of the square root of a magnitude of the second-order polarization mode dispersion vector $|\vec{\tau}_\omega|$ to obtain a first result, according to $\langle|\vec{\tau}_\omega|^{1/2}\rangle$. The first result is multiplied by a proportionality coefficient $A_2$ to calculate the mean differential group delay, in accordance with the following equation:

$$A_2 \langle|\vec{\tau}_\omega|^{1/2}\rangle = \langle\tau\rangle.$$ (21)

Preferably, the proportionality coefficient $A_2$ is obtained from the probability density function of the second-order polarization mode dispersion vector. Most preferably, $A_2$ is substantially equal to 1.37.

A further embodiment of the method of the present invention provides a method for measuring a mean differential group delay $\langle\tau\rangle$ of a length of optical fiber, including an initial step of measuring a magnitude of a polarization mode dispersion vector as a function of frequency, using a frequency-domain polarization mode dispersion measurement apparatus, where the magnitude of the polarization mode dispersion vector is a scalar differential group delay. The method further includes calculating a frequency-derivative of the scalar differential group delay, the frequency derivative being a scalar second-order polarization mode dispersion function. The method further includes calculating a first result, according to $$\left\langle\left|\frac{d|\vec{\tau}|}{d\omega}\right|^{1/2}\right\rangle,$$

and multiplying a proportionality coefficient $B_2$ by the first result. The mean differential group delay is calculated, therefore, in accordance with the following equation:

$$B_2\left\langle\left|\frac{d|\vec{\tau}|}{d\omega}\right|^{1/2}\right\rangle = \langle\tau\rangle.$$ (26)

Preferably, $B_2$ is obtained from the probability density function of the scalar second-order polarization mode dispersion function. Most preferably, $B_2$ is substantially equal to 2.64.

Yet another embodiment of the present invention provides a method for measuring a mean square differential group delay $\tau_{RMS}^2$ of a length of optical fiber, including an initial step of characterizing a polarization mode dispersion vector as a function of frequency using a frequency-domain polarization mode dispersion measurement apparatus. Additionally, a second-order polarization mode dispersion vector is calculated as a function of frequency $\vec{\tau}_\omega$ from the polarization mode dispersion vector. The method further includes calculating a mean of the magnitude of the second-order polarization mode dispersion vector $|\vec{\tau}_\omega|$ to obtain a first result, according to $\langle |\vec{\tau}_\omega| \rangle$. The first result is multiplied by a proportionality coefficient $A_1$ to calculate the mean square differential group delay, in accordance with the following equation:

$$A_1 \langle |\vec{\tau}_\omega| \rangle = \tau_{RMS}^2. \qquad (20)$$

Preferably, $A_1$ is obtained from the probability density function of the second-order polarization mode dispersion vector. Most preferably, $A_1$ is substantially equal to 2.02.

Still another embodiment of the present invention provides a method for measuring a mean square differential group delay $\tau_{RMS}^2$ of a length of optical fiber, including an initial step of measuring a magnitude of a polarization mode dispersion vector as a function of frequency, using a frequency-domain polarization mode dispersion measurement apparatus, where the magnitude of the polarization mode dispersion vector is a scalar differential group delay. The method further includes calculating a scalar second-order polarization mode dispersion function, the scalar second-order polarization mode dispersion function being a frequency-derivative of the scalar differential group delay. Additionally, a first result is calculated according to $$\left\langle \left| \frac{d|\vec{\tau}|}{d\omega} \right| \right\rangle.$$

The first result is multiplied by a proportionality coefficient, $B_1$, to calculate the mean square differential group delay, in accordance with the following equation:

$$B_1 \left\langle \left| \frac{d|\vec{\tau}|}{d\omega} \right| \right\rangle = \tau_{RMS}^2. \qquad (25)$$

$B_1$ is preferably obtained from the probability density function of the scalar second-order polarization mode dispersion function. $B_1$ is most preferably substantially equal to 6.80.

The measurement of polarization mode dispersion through an optical fiber may be through a single optical fiber link or a whole optical fiber route in an optical telecommunication network.

In an additional embodiment of the method of the present invention, a method is provided for characterizing polarization mode dispersion of a length of optical fiber using a source of bandwidth B. The method includes an initial step of collecting polarization mode dispersion data as a function of frequency from a frequency-domain polarization mode dispersion measurement apparatus. The method further includes extracting one of a vector and a scalar frequency-dependent function from the polarization mode dispersion data, by applying a frequency-domain polarization mode dispersion technique, the one of the vector and the scalar function being one of a first-order and second-order polarization mode dispersion function. A systematic correction is applied thereto, wherein the systematic correction minimizes a systematic error in conventional methods of measuring mean differential group delay, caused by the finite source bandwidth B. Applying the systematic correction results in a derivation of one of a mean differential group delay $\langle \tau \rangle$ and a mean square DGD $\tau_{RMS}^2$.

Another method of measuring a mean differential group delay $\langle \tau \rangle$ of a length of optical fiber according to the present invention includes the steps of deriving a first mean $\langle \tau \rangle$ in accordance with equation (21), and a second mean $\langle \tau \rangle$ in accordance with equation (26), and then deriving a linear equation of a sum of the first mean $\langle \tau \rangle$ and the second mean $\langle \tau \rangle$ to calculate a combined mean $\langle \tau \rangle$. A sum of coefficients of the linear equation is substantially equal to one.

Yet another method of measuring a mean square differential group delay $\tau_{RMS}^2$ of a length of optical fiber in accordance with the present invention includes the steps of deriving a first mean square differential group delay $\tau_{RMS}^2$ in accordance with equation (20), deriving a second mean square differential group delay $\tau_{RMS}^2$ in accordance with equation (25), and deriving a linear equation of a sum of the first mean square differential group delay $\tau_{RMS}^2$ and the second mean square differential group delay $\tau_{RMS}^2$ to calculate a combined mean square differential group delay $\tau_{RMS}^2$. A sum of coefficients of the linear equation is substantially equal to one.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION

Figure 1:
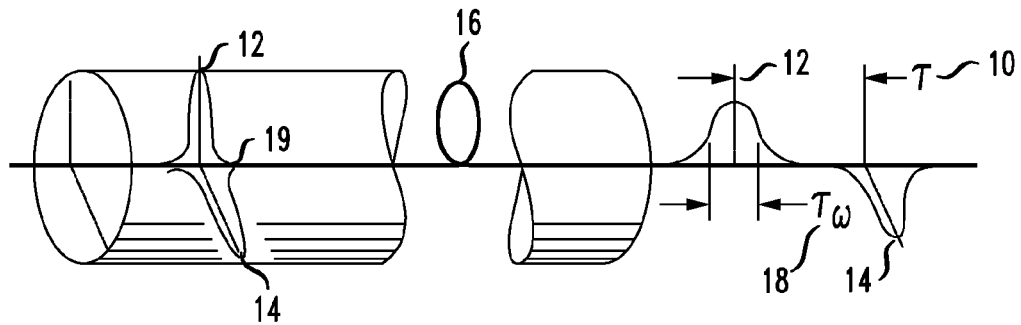
FIG. 1 is a pictorial view of an optical pulse propagating a length of birefringent optical fiber.

The present invention relates to improving the accuracy of calculating a true mean differential group delay (DGD) or a true mean-square DGD $\langle\tau\rangle$ from a measurement of polarization mode dispersion (PMD). The present invention provides a method for correcting a systematic error in a conventional conversion of measured mean-square DGD measurements to a true mean DGD $\langle\tau\rangle$. The systematic error stems from the use of a measurement source of a finite bandwidth B, and from the conventional conversion applied to measured root mean square DGD $\sqrt{\langle\tau^2\rangle_B}$ to obtain an estimate of true mean DGD $\langle\tau\rangle$. By incorporating improved averaging techniques to the measured root mean square DGD $\sqrt{\langle\tau^2\rangle_B}$ obtained with conventional PMD measurement apparatus, the present invention offers improved resolution in true mean $\langle\tau\rangle$ or true mean-square DGD $\langle\tau\rangle$ measurements.

The present invention also provides a method to improve accuracy in measurements of the true mean DGD $\langle\tau\rangle$ of optical fiber using statistics of a second-order polarization mode dispersion (SOPMD) and incorporating improved averaging techniques. A 30% reduction in measurement uncertainty is obtained when using the method in accordance with the present invention, which is equivalent to doubling the bandwidth B of an optical source.

The following notation and definitions are used herein. Optical frequency w refers to $2\pi c/\lambda$, where $\lambda$ is the wavelength of the source and c is the speed of light. Optical wavelength and frequency are used interchangeably to characterize the measurement source. Analogously, spectral bandwidth and frequency bandwidth both refer to the optical source characteristics in wavelength and frequency space, respectively.

An average over a finite angular frequency bandwidth B of a variable $X(\omega)$ associated with a given fiber is denoted and defined as follows:

$$\langle X \rangle_B = \frac{1}{B}\int_{-B/2}^{B/2} X(\omega)d\omega. \tag{1}$$

A "measurement of the mean" refers to a finite bandwidth average, as described by equation (1), applied to an experimentally measurable quantity.

Applying equation (1), a root mean square of a parameter X is then defined as:

$$\sqrt{\langle X^2 \rangle_B} = \sqrt{\frac{1}{B}\int_{-B/2}^{B/2} X^2(\omega)d\omega}. \tag{2}$$

A root mean square (RMS) of the DGD measured as a function of frequency over a source of and width B is therefore denoted generally by:

$$\text{Measured RMS } DGD = \sqrt{\langle\tau^2\rangle_B}, \tag{3}$$

where subscript "B" indicates that measurements are taken over a finite source bandwidth, B.

On the other hand a "true" RMS DGD, obtained by measuring over infinite bandwidth in equation (2) is denoted herein as $\tau_{RMS}$.

Equation (3) may be written as an integral of a function $\tau^2(\omega)$ in accordance with equation (2). As well understood by those skilled in the art, however, when measuring polarization mode dispersion in the frequency domain, a DGD $\langle\tau\rangle$ is measured as the time delay between the principle states of polarization (PSP) associated with a discrete frequency, or equivalently, as the magnitude of the PMD measured at each discrete frequency over the source bandwidth B. An RMS DGD value over a finite bandwidth B may therefore be calculated as an average of the discrete frequency-dependent DGD values over the source bandwidth, in accordance with the following:

$$\sqrt{\langle\tau^2\rangle_B} = \sqrt{\frac{1}{B}\sum_{i=-N}^{N}\tau^2(i\Delta\omega)\Delta\omega}, \tag{4}$$

where $\Delta\omega=B/(2N+1)$, and a total of 2N+1 measurements are made over source bandwidth B.

A mean over an ensemble of N fibers is denoted by a bar over the parameter averaged, such as X in the following equation:

$$\overline{X} = \frac{1}{N}\sum_{k=1}^{N} X_k. \tag{5}$$

Averaging of the same frequency-dependent parameter, the DGD for example, over an infinite number of fibers (N→∞) with identically distributed birefringence, where the parameter is measured for each fiber over a finite bandwidth B, is equivalent to measuring the same frequency-dependent parameter of one fiber over an infinite bandwidth (B→∞). For this "real" or "true" mean, taken over the limit of infinite bandwidth, the subscript "B" is omitted.

A second-order polarization mode dispersion (SOPMD), which is the derivative of the polarization mode dispersion vector with respect to frequency, is represented by $\tau_\omega$.

A fiber link may refer to any fiber optic cable or cable assembly connecting two points, such as optical amplifiers, along an optical transmission line. A fiber route may include multiple fiber links, and includes the total fiber optic cable between any two terminating points in an optical transmission line.

In a first embodiment, a method is provided to more accurately measure the mean of the differential group delay from conventional PMD measurement techniques. The method employs a systematic method to minimize a systematic error that occurs when converting root-mean-square measurements of the spectral-averaged DGD to the true mean DGD $\langle\tau\rangle$ using conventional means. The error is a consequence of the finite bandwidth B of the measurement source.

Figure 2:
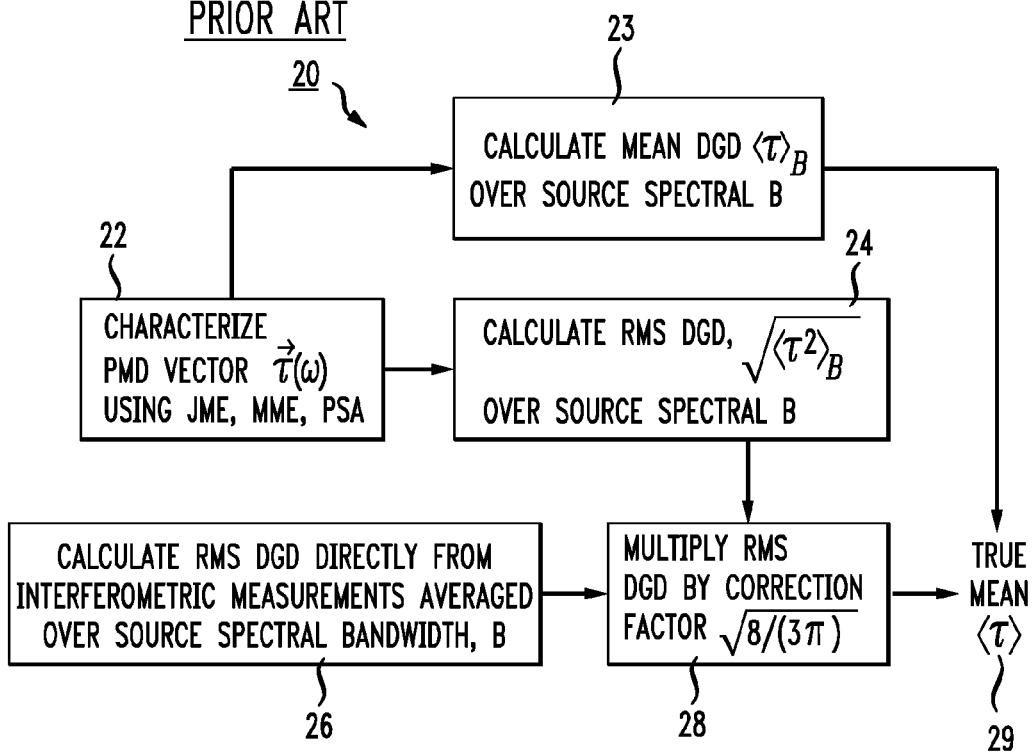
FIG. 2 is a flow diagram illustrating a prior art method for calculating mean differential group delay (DGD).

Referring to FIG. 2, a conventional method 20 of estimating the true mean DGD $\langle\tau\rangle$ includes the step 22 of characterizing the PMD vector using techniques commonly known, such as Jones Matrix Eigenanalysis (JME), Müller Matrix Method (MMM), and Poincaré Sphere Analysis (PSA). In step 23, the mean DGD is calculated as an average over the spectral source bandwidth to estimate a true mean. Alternatively, in step 24, the RMS value of the DGD $\sqrt{\langle\tau^2\rangle_B}$ is calculated from the magnitude of the frequency-averaged PMD vector, in accordance with equation (4), for example. Alternately, step 26 is used to derive $\sqrt{\langle\tau^2\rangle_B}$ directly from an interferometric measurement of the square of time delay averaged over the source bandwidth. In step 28, $\sqrt{\langle\tau^2\rangle_B}$ derived from either step 24 or step 26 is multiplied by a conventional correction factor to calculate an estimate of true mean $\langle\tau\rangle$ 29.

It has been commonly assumed in the prior art that the DGD can be statistically represented by a Maxwellian distribution. Therefore, based on statistical probability theory, an estimate of mean DGD is calculated by measuring $\sqrt{\langle\tau^2\rangle_B}$ for a fiber and estimating the mean that would be found for an ensemble comprised of an infinite number of fibers in accordance with equation (5), by multiplying the result by the conventional correction factor of $$\sqrt{\frac{8}{3\pi}}.$$

In other words, by conventional methods, the following equation is applied to obtain an estimate of true mean $\langle\tau\rangle$ 29 in accordance with step 28 of FIG. 2:

$$\langle\tau\rangle \approx \sqrt{\frac{8}{3\pi}}\sqrt{\langle\tau^2\rangle_B}. \tag{6}$$

The validity of this approximation may be verified by comparing:

$$\overline{\langle\tau\rangle_B} \xrightarrow{?} \sqrt{\frac{8}{3\pi}} \cdot \overline{\sqrt{\langle\tau^2\rangle_B}}, \tag{7}$$

where the ensemble averaging is taken over a multiplicity of different fibers with identically distributed birefringence.

Equation (7) is only correct, however, as B→∞, and introduces a systematic error when the measurement bandwidth B is finite. This is the easiest to see in the extreme case of a very small bandwidth, that is as B→0. This case corresponds to a situation where only one frequency point per fiber is used to make a measurement of mean DGD. Averaged over many fibers with identically distributed birefringence, the left hand side LHS of equation (7) will converge to $\langle\tau\rangle$, while its right hand side RHS will converge to $$\sqrt{\frac{8}{3\pi}}\langle\tau\rangle,$$

resulting in about an 8% systematic error.

In the method of the present invention, a function F is derived, which is defined on the frequency span from −B/2 to B/2 to obtain an estimate of the DGD as a function of source bandwidth B, denoted as τ(B), such that $$F[\tau(\omega)]=\tau(B). \tag{8}$$

The function is defined so that for an ensemble of many different fibers with the same $\tau_{RMS}$, its ensemble average converges to the true mean $\langle\tau\rangle$, as $$\overline{\tau(B)}=\langle\tau\rangle, \tag{9}$$

and the standard deviation of τ(B), denoted as std(τ(B)), is minimized relative to the standard averaging.

To derive a systematic correction factor, the systematic error is estimated asymptotically when the product of the bandwidth B and $\tau_{RMS}$ is much greater than 1 ($\tau_{RMS}B\gg1$) and the systematic error is small. The result of any measurement of the mean square DGD averaged over a finite source bandwidth B, or $\langle\tau^2\rangle_B$, is represented by the following equation:

$$\frac{8}{3\pi}\langle\tau^2\rangle_B = \langle\tau\rangle^2 + \eta, \tag{10}$$

where η represents the deviation of the measurement from the mean found for the ensemble, and the average of η values for the ensemble is zero ($\overline{\eta}=0$). Assuming that this deviation is small, a binomial expansion can be applied to approximate η so that equation (10) can be written in the following form:

$$\sqrt{\frac{8}{3\pi}\langle\tau^2\rangle_B} \cong \langle\tau\rangle + \frac{\eta}{2\langle\tau\rangle} - \frac{\eta^2}{8\langle\tau\rangle^3}. \tag{11}$$

Since $\overline{\eta}=0$, taking an ensemble average of each side of equation (11) leaves only the $\eta^2$ term and $\langle\tau\rangle$ on the right hand side, so that the systematic error ε in measuring the mean DGD can be estimated from the following equation:

$$\varepsilon = \langle\tau\rangle - \sqrt{\frac{8}{3\pi}\langle\tau^2\rangle_B} - \frac{\overline{\eta^2}}{8\langle\tau\rangle^3}. \tag{12}$$

The systematic error ε is equivalently a systematic correction factor ε that is applied to the measured RMS DGD $\sqrt{\langle\tau^2\rangle_B}$ to improve the resolution of true mean DGD $\langle\tau\rangle$ calculations.

The variance of $\langle\tau^2\rangle_B$ was evaluated in M. Shtaif and A. Mecozzi, "Study of the Frequency Autocorrelation of the Differential Group Delay in Fibers with Polarization Mode Dispersion," *IEEE Photon. Tech. Lett.*, Vol. 25, pp. 707-709 (May 2000) for $\tau_{RMS}B\gg1$ as follows:

$$\mathrm{var}\langle\tau^2\rangle_B=(\pi^2/\sqrt{2})\langle\tau\rangle^3/B, \tag{13}$$

where the variance is defined as follows:

$$\mathrm{var}\langle\tau^2\rangle_B = \overline{(\langle\tau^2\rangle_B - \langle\tau^2\rangle)^2}. \tag{14}$$

With the help of equation (10) to derive an expression for $\overline{\eta^2}$, and substituting the expression for the variance from equation (13), a value for the systematic error can be evaluated from equation (12) as follows:

$$\varepsilon = \left(\frac{8}{3\pi}\right)^2 \frac{\overline{(\langle\tau^2\rangle_B - \langle\tau^2\rangle)^2}}{8\langle\tau\rangle^3} = \frac{8}{9\sqrt{2}}\frac{1}{B}. \quad (15)$$

In order to obtain an unbiased estimate of the mean DGD $\langle\tau\rangle$, therefore, the following equation is preferably applied to the mean-square DGD $\langle\tau^2\rangle_B$ measured using any of the conventional measurement techniques for obtaining the mean-square DGD:

$$\langle\tau\rangle = \sqrt{\frac{8}{3\pi}\langle\tau^2\rangle_B} + \varepsilon, \quad (16a)$$

$$\text{where } \varepsilon = \frac{8}{9\sqrt{2}}\frac{1}{B}. \quad (16b)$$

One embodiment of the method of the present invention, therefore, includes the steps of deriving a frequency-averaged RMS measurement of the DGD $\langle\tau^2\rangle_B$ from conventional PMD measuring apparatus, and applying a systematic correction to the measured RMS to obtain true mean DGD $\langle\tau\rangle$. As shown in equation (16a), the systematic correction is made by adding a systematic correction factors to the conventional approximation of $\langle\tau\rangle$ that is described by equation (6). The preferred systematic correction factor $\varepsilon$ is characterized by equation (16b) above. The measuring apparatus can include the time-domain and frequency-domain measurement devices, as described below.

Examples of conventional measurement techniques to which this systematic correction can be applied include, but are not limited to, frequency-domain measurement techniques such as JME, MMM, PSA, and time-domain techniques such as low-coherence interferometry. A fundamentally equivalent method to a scanning Michelson interferometer, that also works in the frequency domain, is the Fixed Analyzer Technique.

Figure 3:
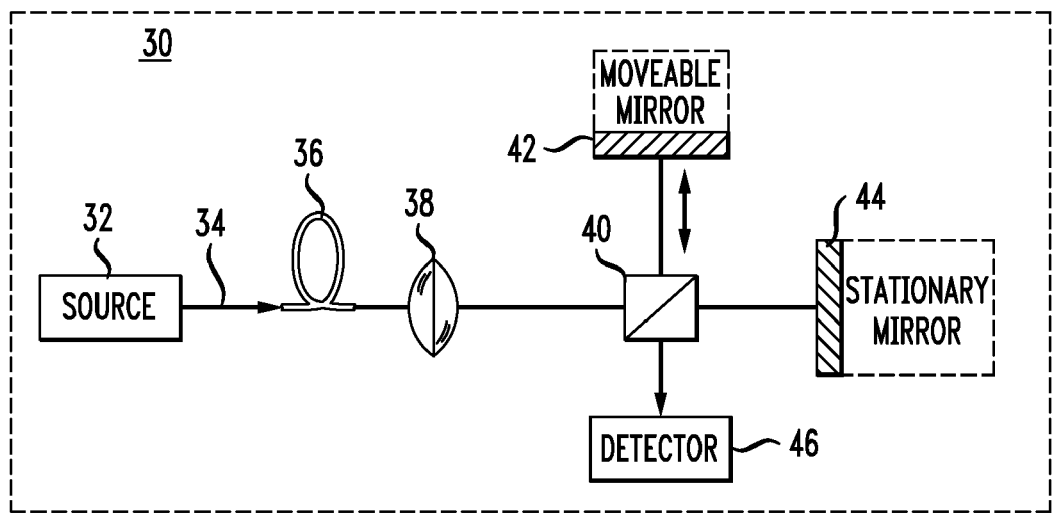
FIG. 3 is a block diagram illustrating a conventional interferometric polarization mode dispersion (PMD) measuring device.

A block diagram of an interferometer 30 for PMD measurements in the time-domain is shown in FIG. 3. Time-domain techniques provide a direct measure in the time-domain of the frequency-averaged DGD. The commonly known interferometric technique for measuring PMD is described in more detail in N. Gisin, J. P. Von der Weid and J. P. Pellaux, "Polarization Mode Dispersion of Short and Long Single-Mode Fibers," *J. Lightw. Technol.*, Vol. 9, p. 821 (1991), which is incorporated herein by reference. In the Michelson-type interferometer 30 of FIG. 3, for example, a spectrally broad (low-coherence) source 32 is used to couple light 34 into the device under test (fiber) 36. The output of fiber 36 is collimated using collimating optics 38 and directed onto a beamsplitter 40. The beamsplitter 40 divides the light into two paths along two arms of the interferometer 30. One path is directed toward a moveable mirror 42, which can be translated along a path coincident with the direction of the incident light. The second is directed toward a stationary mirror 44. When the mirror 42 is translated, interference fringes are seen by a detector 46 as long as the time-delay difference between the two arms matches a delay generated in the device under test 36 to within a coherence time of the source 32.

In the simplest case of a non-mode-coupled device, the interferogram provided by a conventional interferometer 30 is symmetric and represented by two side lobes and a central autocorrelation peak. The distance from a side lobe to the central peak represents the DGD averaged over the source spectrum or bandwidth. In the mode-coupled case of a fiber, the interferogram includes multiple peaks representing various principle states of polarization (PSP) associated with different frequencies. In this case, as well-known to those skilled in the art, the DGD is characterized as a RMS value over the bandwidth, that is $\sqrt{\langle\tau^2\rangle_B}$, as described by equation (3). Discrete measurements of the PMD as a function of frequency are not needed since the time-domain measurements are inherently frequency-averaged over the source bandwidth.

Figure 4:
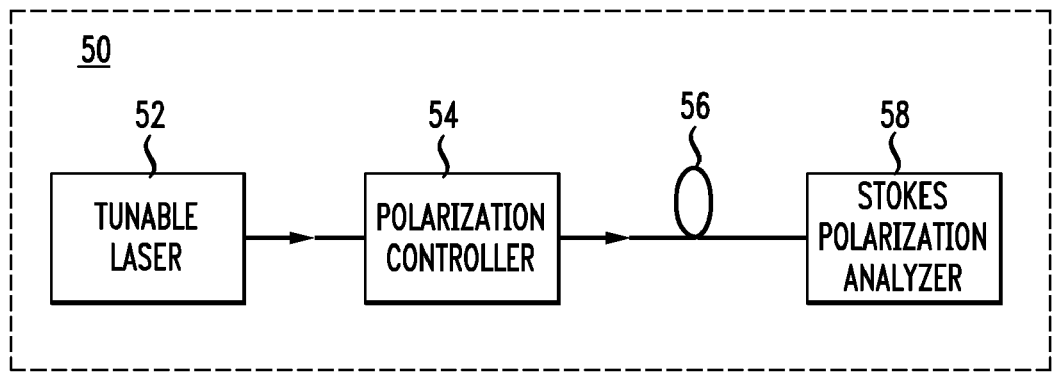
FIG. 4 is a block diagram illustrating a conventional apparatus used in a frequency-domain PMD measuring device.

FIG. 4 shows a block diagram of a common polarimeter 50 that can be used in a measurement device for any of the frequency-based techniques, such as PSA, JME, and MMM. In FIG. 4, a polarization state of a tunable laser 52 is controlled by a polarization controller 54. The polarized output from the controller 54 is coupled to the fiber under test 56. The polarization state of the optical signal after traversing the length of fiber 56 is then analyzed with a conventional polarization state analyzer 58. By stepping the laser 52 in specified frequency intervals over the entire bandwidth, an output polarization state for each input polarization state is obtained as a function of frequency. Each technique differs in which input polarization states are used and in how the data set of measured output polarization states are manipulated. The result, however, is the same: a measurement of the PMD vector, that is, both DGD and the PSP as a function of frequency.

The PSA and JME techniques are well-known to those skilled in the art and are described in detail, for example, in Normand Cyr, Andre Girard, and Gregory W. Schinn, "Stokes Parameter Analysis Method, the Consolidated Test Method for PMD Measurements", *NFOEC '99 Convention, Chicago, Ill.* (1999), which is incorporated herein by reference. These techniques are based on the measurement of so-called polarimetric Stokes parameters. These two techniques differ in the algorithms used to describe the PMD from the measured Stokes parameters, as well as in the required form of the generally three measured Stokes parameters. The JME algorithm requires only linear input states of polarization (SOP), whereas the PSA algorithm usually requires one of the three input states to be circular.

The PSA and JME methods are alike, however, in requiring the same test procedures. Both find the PSP and the DGD as a function of frequency from raw polarimetric data. The raw polarimetric data is the normalized Stokes vector representing the SOP at the output of a fiber as a function of optical frequency for a number of input SOPs. The normalized Stokes vector, $\hat{s}$, is the position of the output SOP on a Poincaré sphere. Basically, both methods measure the local "angular velocity" (where time is actually optical frequency here) of the output SOP from a measurement of its position on the sphere at two neighboring optical frequencies $\omega$ and $(\omega+\Delta\omega)$. One difference is that PSA is performed directly in the Stokes parameter representation of the SOP, while JME is performed in the Jones vector representation, after the Stokes vectors have been transformed into normalized Jones vectors.

The MMM technique has been described as a combination of the PSA and JME method. The MMM method is described in detail in R. M. Jopson, L. E. Nelson, and H. Kogelnik "Measurement of Second-Order Polarization-Mode Dispersion Vectors in Optical Fibers", *IEEE Phot. Tech. Lett.*, Vol. 11, No. 9, pp. 1153-55 (September 1999). Like the other two techniques, the MMM requires the determination of transmitted output Stokes vectors corresponding to two input polarizations $s_i$ at each frequency ω. Unlike PSA however, MMM has the ability to determine the rotation matrix of the fiber. It also stays entirely in Stokes vector space. The technique is advantageously independent of the relative angle between the two input linear polarizations. MMM may also be used with a interleaving method to measure the first- and second-order PMD vectors of fibers, as described in Jopson, et al.

Both the interferometer of FIG. 3 and the polarimeter of FIG. 4, as well as any conventional PMD apparatus, can be used to produce frequency-averaged RMS measurements of the DGD over the source bandwidth. The systematic correction obtained above in equation (16b) can then be directly applied to the measured RMS DGD $\tau_{RMS}$ as in equation (16a) to minimize the error in calculating the true mean DGD $\langle\tau\rangle$.

The method of the present invention provides a systematic correction for the property measurements of $\langle\tau\rangle_B$ and $$\sqrt{\frac{8}{3\pi}\langle\tau^2\rangle_B}$$

are not equivalent, due to the physical limitation imposed by the finite source bandwidth. In other words, taking the square root of a frequency-averaged parameter leads to systematic errors for finite bandwidth measurements. The systematic correction for this property can also be extended to higher powers of DGD and to frequency derivatives of PMD.

In another embodiment of the present invention, a method of more accurately measuring mean DGD $\langle\tau\rangle$ is provided by measuring a second-order PMD (SOPMD) over a finite bandwidth B and applying a systematic correction to minimize the random errors that typically occur from the measurement over a finite bandwidth. The systematic correction includes an averaging procedure that avoids the systematic error induced by conventional methods of taking roots after averaging over frequency. This method produces superior results when the fiber length over which measurements are performed is considerably longer than the birefringence correlation length, as is the case for fiber spans in telecommunication systems.

It is shown in G. J. Foschini and C. D. Poole, "Statistical Theory of Polarization Dispersion in Single Mode Fibers," *IEEE Journ. of Lightwave Techn.*, Vol. 9, pp. 1439-1456 (November 1991) ("Foschini and Poole"), that the mean of the SOPMD in a fiber, represented by $\langle\tau_\omega\rangle$ depends only on its mean square DGD $\langle\tau^2\rangle$ when the fiber is much longer than the correlation length of its birefringence, in accordance with the following equation:

$$\langle\tau_\omega^2\rangle = \frac{1}{3}\langle\tau^2\rangle^2. \quad (17)$$

It has also been shown that the SOPMD can be accurately measured experimentally if the measurements are performed with a small enough frequency step. (See R. M. Jopson, L. E. Nelson, H. Kogelnik, "Measurement of Second-Order Polarization-Mode Dispersion Vectors in Optical Fibers", *IEEE Phot. Tech. Lett*, Vol. 11, pp. 1153-55 (September 1999), incorporated herein by reference.) Jopson et al. applied an interleaving technique to increase the frequency resolution of the measurements, then applied the Müller Matrix Method (MMM) to these measurements to obtain the PMD vector, and calculated the RMS DGD $\tau_{RMS}$ from the magnitude of the PMD vector $\vec{\tau}$. In addition, Jopson et al. calculated the SOPMD from these measurements and applied the Foschini and Poole relation described by equation (20) to estimate either the mean square DGD $\langle\tau^2\rangle$ or the root mean square DGD $\tau_{RMS}$.

As described above, however, due to the finite bandwidth B of the source used for the measurement, a systematic error occurs when taking the square root of a mean square value averaged over frequency. The direct application of equation (17) according to the prior art, therefore, produces inaccurate results, especially over low source bandwidths. The error is present whether it is a first, second, or higher order of PMD that is measured as a frequency-averaged RMS value. The estimate of the mean DGD $\langle\tau\rangle$ from second-order PMD measurements, therefore, will also be biased at small measurement bandwidths for reasons very similar to the embodiment described above with respect to first order PMD measurements.

An additional embodiment of the method of the present invention, therefore, provides an accurate measure of the mean DGD $\langle\tau\rangle$ from measurements of the SOPMD taken over a finite bandwidth B, by applying a systematic correction to minimize the random errors that occur from the measurement over a finite bandwidth. The systematic correction includes an averaging technique that avoids the systematic error induced by conventional methods of taking roots after averaging over frequency.

A further embodiment of the method of the present invention provides an accurate measure of the mean squared DGD $\tau^2_{RMS}$ from measurements of the SOPMD taken over a finite bandwidth, by applying a systematic correction to minimize the random errors that occur from the measurement over a finite bandwidth. The systematic correction includes an averaging technique that avoids the systematic error induced by conventional methods of taking roots after averaging over frequency.

The SOPMD is the first derivative of the PMD with respect to frequency, representing the change in the PMD as a function of frequency. Specifically, if $\vec{\tau}(\omega)$ denotes the PMD vector for a frequency ω, defined by the principal states of polarization (PSP) at that frequency ω, then the magnitude of the vector $|\vec{\tau}(\omega)|$ is the differential group delay DGD τ or the set of PSP defined for frequency ω. Therefore, a set of vector PMD data as a function of frequency ω and a set of scalar DGD data as a function of frequency ω may be generated from any of the methods used to extract the PMD from a frequency-domain measurement device. Such measurement device may comprise a polarimeter or a Fixed Analyzer, for example.

In addition, a second-order PMD can be defined as either a vector or scalar quantity. The vector SOPMD is denoted as $\vec{\tau}_\omega$ and is found from the set of vector PMD data, according to the conventional method of defining a derivative from a discrete data set of n sampled frequency points as follows:

$$\vec{\tau}_\omega(\omega_n) = \frac{\vec{\tau}(\omega_{n+1}) - \vec{\tau}(\omega_n)}{\omega_{n+1} - \omega_n}. \quad (18)$$

The scalar SOPMD is more easily calculated as the derivative of the scalar DGD and is denoted as $$\frac{d|\vec{\tau}(\omega)|}{d\omega},$$

where again, the magnitude of the vector $|\vec{\tau}(\omega)|$ is the differential group delay DGD $\tau$, a scalar quantity. This scalar SOPMD is found directly from the set of frequency-dependent scalar DGD $\tau$ values, i.e. from $\tau(\omega)$, according to the conventional method of defining a derivative from a discrete data set as follows:

$$\tau_\omega(\omega_n) = \frac{\tau(\omega_{n+1}) - \tau(\omega_n)}{\omega_{n+1} - \omega_n}. \tag{19}$$

Different quantities scaling as $\tau$ and $\tau^2$ respectively are preferably used to avoid bias in the calculated results for each of these embodiments. A probability density function (PDF) for the magnitude of the scalar SOPMD and the vector SOPMD have been calculated by Foschini, et al. in "Probability Densities of Second-Order Polarization Mode Dispersion Including Polarization Dependent Chromatic Fiber Dispersion," *IEEE Phot. Tech. Lett.*, Vol. 12, pp. 293-295 (March 2000), (Foschini et al.), which is incorporated herein by reference.

By integrating the probability density function for the magnitude of the vector SOPMD in conjunction with equation (17), the mean square and the mean of the DGD may be derived, resulting in the following relationships:

$$A_1 \langle \vec{\tau}_\omega \rangle = \tau_{RMS}^2 \tag{20}$$

$$A_2 \langle |\vec{\tau}_\omega|^{1/2} \rangle = \langle \tau \rangle. \tag{21}$$

Coefficient $$A_1 = \frac{3\pi^2}{16 G} \approx 2.02 \text{ and}$$

$$A_2 = \left[\frac{3}{2\sqrt{\pi}} \sum_{k=0}^{\infty} \frac{(-1)^k}{(2k+1)^{3/2}}\right]^{-1} \approx 1.37 \text{ (Catalan constant } G \approx 0.916\text{)}$$

may be calculated from the PDF of the SOPMD, and verified by simulations. Written this way, equations (20) and (21) provide a way to estimate, without bias, the mean DGD and the mean square DGD using the SOPMD vector magnitude $|\vec{\tau}_\omega|$.

PMD and SOPMD measurements are strongly correlated as seen from the relation for the conditional mean square of the SOPMD, derived in J. P. Gordon, "Statistical Properties of Polarization Mode Dispersion", *Proc. VSS'02* (Venice, Italy 2002) and provided below:

$$\langle \tau_\omega^2 | \tau \rangle = \frac{2}{9}\tau^2 \langle \tau^2 \rangle + \frac{1}{9} \langle \tau^2 \rangle^2. \tag{22}$$

Therefore, if a specific measurement of the mean DGD of a given fiber is above the "true" mean, the mean DGD estimated from equation (21) will be overestimated as well. Gordon, however, has shown that the conditional mean square of the component of the second order PMD vector that is parallel to the direction of the PMD vector is independent of the PMD vector length and can also be expressed in terms of the mean DGD $\langle \tau \rangle$ as follows:

$$\langle (\vec{\tau}_\omega \cdot \hat{\tau})^2 | \tau \rangle = \frac{1}{27} \langle \tau^2 \rangle^2. \tag{23}$$

Equation (23) can also be used to provide an independent measure of the mean square DGD $\langle \tau^2 \rangle$ by recognizing that the parallel component of the second order PMD in equation (23) is, equivalently, the frequency derivative of the DGD, as follows:

$$\vec{\tau}_\omega \cdot \hat{\tau} = \frac{d|\vec{\tau}|}{d\omega}. \tag{24}$$

The frequency derivative may be calculated from the scalar DGD vs. frequency measurements performed by a standard non-vectorial instrument, allowing the technique to be used with conventional PMD test sets. As before, to avoid systematic errors, equation (23) may be combined with equation (24) and rewritten after application of the PDF of the scalar SOPMD as:

$$B_1 \left\langle \left|\frac{d|\vec{\tau}|}{d\omega}\right| \right\rangle = \tau_{RMS}^2, \tag{25}$$

and $$B_2 \left\langle \left|\frac{d|\vec{\tau}|}{d\omega}\right|^{1/2} \right\rangle = \langle \tau \rangle. \tag{26}$$

These relationships provide another unbiased evaluation of the mean DGD using the frequency derivative of the DGD, and can be verified with simulations. The coefficients $$B_1 = \frac{3\pi}{2\log 2} \approx 6.80$$

and $$B_2 = \left[\frac{1}{2} \int_0^\infty \sqrt{y} \sec h^2 y\, dy\right]^{-1} \approx 2.64$$

do not depend on the fiber parameters, and may be calculated from the PDF derived for SOPMD, as described in Foschini et al.

While equations (20) and (21) require the SOPMD in vector form, found in accordance with equation (18) above, equations (25) and (26) require only the scalar DGD, measured at discrete frequency intervals, so that the scalar SOPMD may be calculated, for example, in accordance with equation (19). Non-vectorial instruments that provide discrete rather than frequency-averaged scalar DGD measurements may, therefore, be used to calculate $\tau_{RMS}^2$ and $\langle \tau \rangle$ from equations (25) and (26) respectively.

The improved accuracy of the method in accordance with the present invention for estimating the mean DGD $\langle\tau\rangle$ and the mean square DGD $\langle\tau^2\rangle$ from the measured SOPMD, to that of the conventional averaging techniques, has been demonstrated in simulations.

To estimate the measurement accuracy numerically, a simulation may be performed on 10000 fibers consisting of 1000 random sections of birefringence. The polarization components, for example, Stokes components as well-known in the art, of the birefringence vector of each section in the simulation preferably have independent identical Gaussian distribution. The delay of all birefringent sections is preferably normalized to ensure that the true mean DGD is equal to $\tau_{RMS}$, and to prevent additional variations in the measurement due to the difference in "true" mean DGD among fibers. The PMD vector and its frequency derivative are preferably computed at 256 angular frequency points separated by $$\Delta\omega = \frac{2\pi}{10\tau_{RMS}},$$

which is much less than the DGD correlation bandwidth. This corresponds to the DGD-angular bandwidth product $B\tau_{RMS}\approx150$. By averaging DGD and the other quantities in equations (20), (21), (25), and (26) over a different number of frequency points for every fiber, the effect that the bandwidth of the optical source has on the accuracy of the PMD measurement can be evaluated. It is expected that all simulated measurements will be centered at $\langle\tau\rangle$ independently of the measurement bandwidth used.

Figure 5:
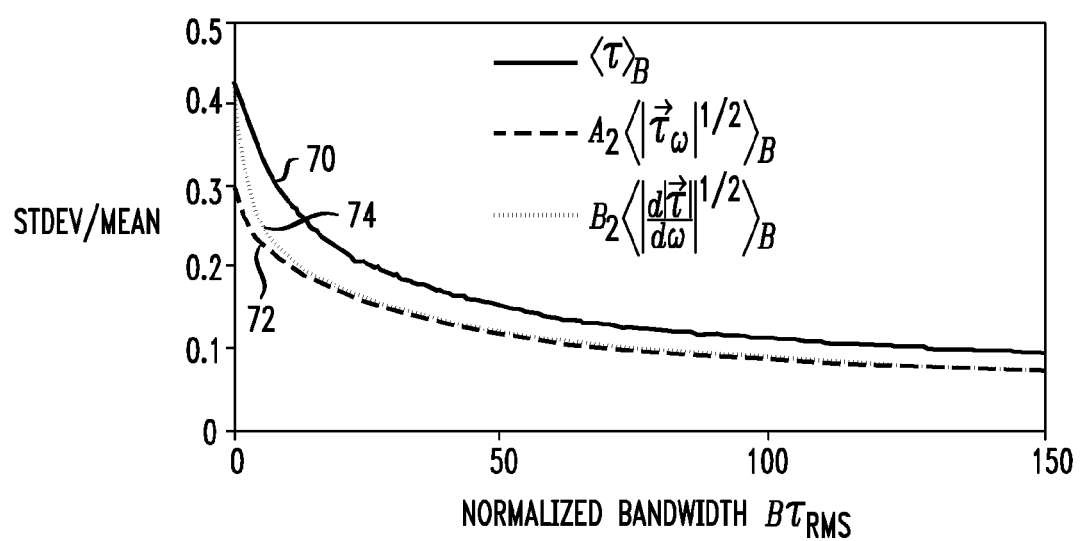
FIG. 5 is a plot of the standard deviation of the distribution of simulated mean DGD measurements of $$\langle \tau \rangle_B, \ A_2 \langle |\vec{\tau}_\omega|^{1/2} \rangle_B, \ \text{and} \ B_2 \left\langle \left| \frac{d|\vec{\tau}|}{d\omega} \right|^{1/2} \right\rangle_B.$$

FIG. 5 shows a plot of the normalized standard deviations of the mean DGD measurements obtained by direct averaging of DGD (solid line) 70, by estimating $\langle\tau\rangle$ from the vector SOPMD using equation (21) (dashed line) 72, and from the scalar SOPMD using equation (26) (dotted line) 74. As shown in FIG. 5, the mean DGD estimated from the second order PMD, whether estimated from the vector or scalar SOPMD, provides significantly better accuracy over the prior art method of direct averaging.

Figure 6A:
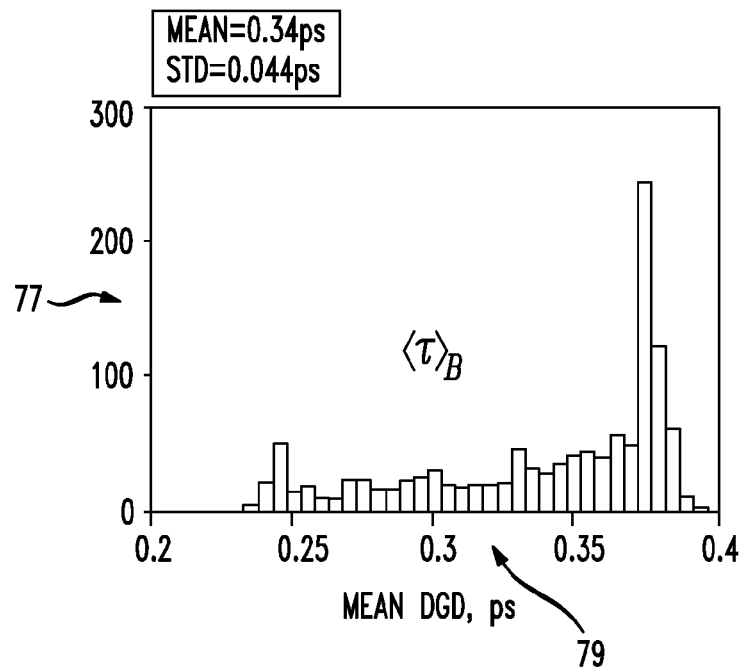
FIGS. 6a and 6b are plots showing the improved standard deviation obtained with a systematic correction applied according to the method of the present invention.
Figure 6B:
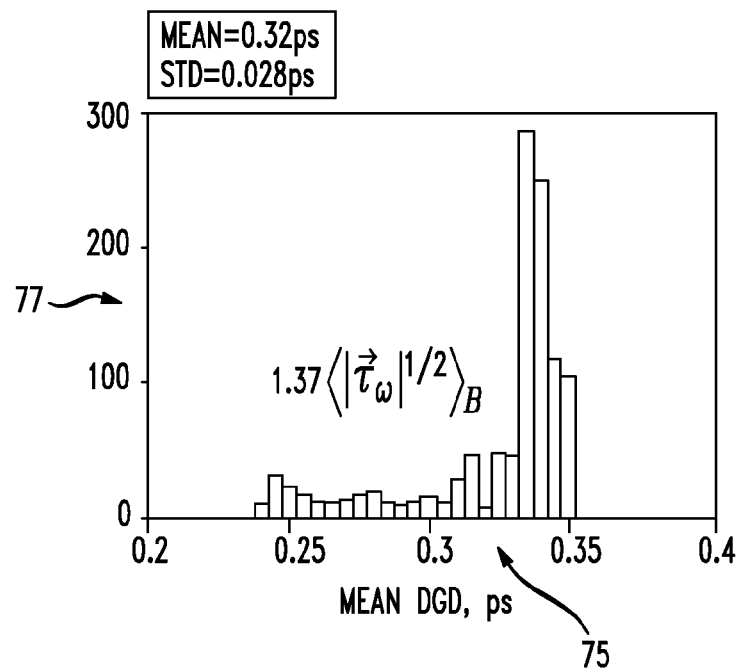

Referring to FIGS. 6a and 6b, reductions in the standard deviation achieved by applying the statistical SOPMD to estimates of the mean DGD are shown. In FIGS. 6a and 6b, the number of samples 77 (pps) is plotted as a function of the mean DGD calculated in FIG. 6b from the vector SOPMD 75, and as a function of the mean DGD calculated in FIG. 6a directly as an average 79. The standard deviation shown in FIG. 6a for the averaged DGD 79 is about 0.044 ps, as compared with a standard deviation shown in FIG. 6b of 0.028 pps for the mean DGD derived from SOPMD. This amounts to a factor of about a $\sqrt{2}$ reduction in the standard deviation, which corresponds to a two-fold reduction of the measurement variance. This reduction is comparable to the effect that would be achieved by doubling the normalized measurement bandwidth in standard PMD measurement techniques.

Figure 7:
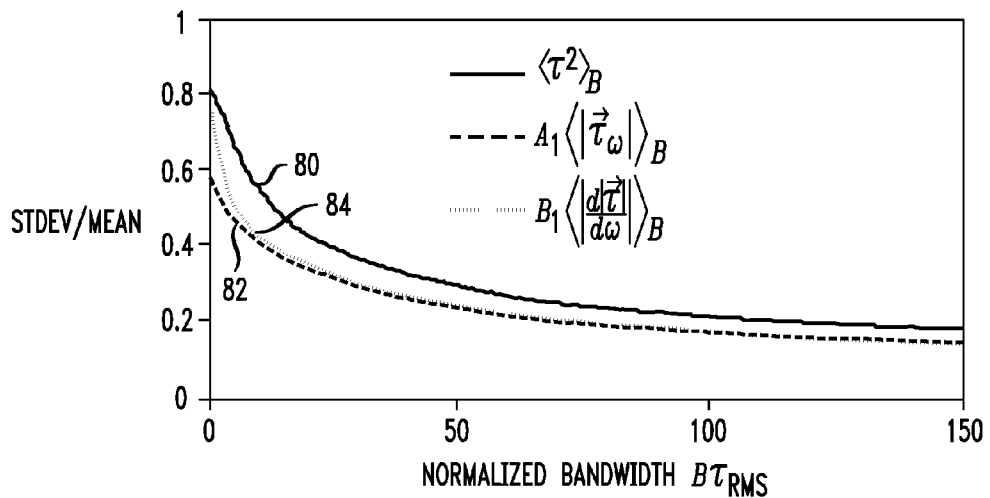
FIG. 7 is a plot of the standard deviation of the distribution of simulated square mean DGD measurements of $$\langle \tau^2 \rangle_B, \ A_1 \langle |\vec{\tau}_\omega| \rangle_B, \ \text{and} \ B_1 \left\langle \left| \frac{d|\vec{\tau}|}{d\omega} \right| \right\rangle_B.$$

FIG. 7 shows a plot of the normalized standard deviations for the mean square DGD $\langle\tau^2\rangle_B$, measured directly (solid line) 80, and by estimating the mean square DGD from the vector SOPMD using equation (20) (dashed line) 82, and from the scalar SOPMD using equation (25) (dotted line) 84. A significant reduction of the measurement uncertainty of at least 30% is shown in the simulation plotted in FIG. 7.

Figure 8:
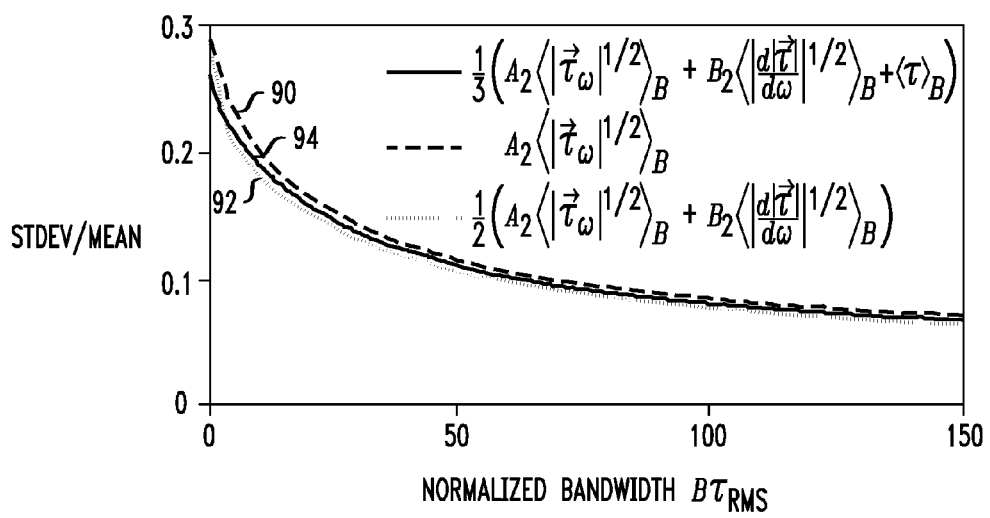
FIG. 8 is a plot of standard deviation resulting from combining the methods shown in FIG. 5.

These numerical simulations also show that the mean DGD measurements taken by different methods are not entirely correlated. Averaging the results of these estimation techniques, therefore, allows further reduction of the measurement uncertainty. FIG. 8 presents the incremental improvements in the measurement accuracy obtained by combining measurement techniques. Shown in dashed curve 90 is the standard deviation of the measurements of $A_2\langle|\vec{\tau}_\omega|^{1/2}\rangle(=\langle\tau\rangle)$, which represents the preferred method of calculating $\langle\tau\rangle$ of those shown in FIG. 5. The dotted curve 92 represents the standard deviation resulting from combining the estimates of DGD $\langle\tau\rangle$ from the vector SOPMD 72 and the scalar SOPMD 74 (see FIG. 5). Marginal improvement in the standard deviation is shown by combining techniques as shown by dotted curve 92. The solid curve 94 additionally averages in the result from direct averaging of the DGD 70 (see FIG. 5), which also shows some improvement over the use of the single technique 90.

An alternate method of the present invention includes combining the statistical results of more than one of the methods provided herein to further reduce the error in measuring the DGD. Specifically, a linear combination for the mean differential group delay DGD $\langle\tau\rangle$ is preferably obtained from the LHS of equations (21) and (26), to obtain a measurement of mean differential group delay DGD $\langle\tau\rangle$. Coefficients of each term in the linear combination are preferably normalized so that a sum of the coefficients is substantially equal to one. Similarly, a linear combination for the mean square differential group delay DGD $\langle\tau^2\rangle_B$ is preferably obtained from the LHS of equations (20) and (25), to obtain a measurement of mean square differential group delay DGD $\langle\tau^2\rangle_B$. Coefficients of each term in the linear combination are preferably normalized so that a sum of the coefficients is substantially equal to one. Analyses of the statistics of even higher orders of the PMD may also offer improvement over the prior art.

The methods provided herein in accordance with the present invention may be applied to more accurately measure the true mean DGD in a fiber link or a whole fiber route in an optical telecommunication system.

Although illustrative embodiments of the present invention have been described herein with reference to the accompanying drawings, showing results of applying the statistics up to the second-order PMD to more accurately measure the differential group delay of fiber, it is to be understood that the invention is not limited to those precise embodiments, and that various other changes and modifications may be effected therein by one skilled in the art without departing from the scope or spirit of the invention.

What is claimed is:

1. A method of determining a mean differential group delay associated with a length of optical fiber comprising the steps of:

measuring a magnitude of a polarization mode dispersion vector $|\tau_\omega|$ as a function of frequency, using a frequency-domain polarization mode dispersion measurement apparatus, the magnitude of the polarization mode dispersion vector $|\tau_\omega|$ being a scalar differential group delay;

calculating a frequency derivative of the scalar differential group delay $$\frac{d|\vec{\tau}|}{d\omega}$$

from the magnitude of the polarization mode dispersion vector to obtain a first result, the frequency derivative of the scalar differential group delay being a scalar second-order polarization mode dispersion function;

multiplying a proportionality coefficient $B_2$ by the first result to calculate the mean differential group delay $\langle\tau\rangle$, where $B_2$ is dimensionless, $\tau$ and $\langle\tau\rangle$ are in units of seconds, $\omega$ is in units of radians/second, and $|\tau_\omega|$ and $$\frac{d|\vec{\tau}|}{d\omega}$$

are in units of seconds$^2$; and outputting a value of the mean differential group delay $\langle\tau\rangle$.

2. The method of claim 1, wherein the first result is calculated according to $$\left\langle \left|\frac{d|\vec{\tau}|}{d\omega}\right|^{1/2} \right\rangle,$$

where $|\tau|$ is in units of seconds, and the mean differential group delay is calculated in accordance with the following equation:

$$B_2 \left\langle \left|\frac{d|\vec{\tau}|}{d\omega}\right|^{1/2} \right\rangle = \langle\tau\rangle.$$

3. The method of claim 2, wherein $B_2$ is substantially equal to 2.64.

4. The method of claim 1, wherein the frequency-domain polarization mode dispersion measurement apparatus comprises one of a polarimetric device and a fixed analyzer device.

5. The method of claim 1, wherein the length of optical fiber is at least one of a single optical fiber link and an optical fiber route.

* * * * *